(12) United States Patent
Gomes et al.

(10) Patent No.: US 8,842,634 B2
(45) Date of Patent: Sep. 23, 2014

(54) EVALUATING AND REPORTING MEASUREMENTS FOR H(E)NB OUTBOUND MOBILITY AND INTER-H(E)NB MOBILITY IN CONNECTED MODE

(75) Inventors: Sylvie Gomes, Douglaston, NY (US); Diana Pani, Montreal (CA); Virgil Comsa, Montreal (CA)

(73) Assignee: Interdigital Patent Holdings, Inc., Wilmington, DE (US)

( * ) Notice: Subject to any disclaimer, the term of this patent is extended or adjusted under 35 U.S.C. 154(b) by 102 days.

(21) Appl. No.: 12/986,626

(22) Filed: Jan. 7, 2011

(65) Prior Publication Data

US 2012/0014267 A1 Jan. 19, 2012

Related U.S. Application Data

(60) Provisional application No. 61/293,511, filed on Jan. 8, 2010.

(51) Int. Cl.
*H04W 52/40* (2009.01)
*H04W 36/00* (2009.01)
*H04W 84/04* (2009.01)

(52) U.S. Cl.
CPC ........ *H04W 36/0088* (2013.01); *H04W 84/045* (2013.01)
USPC ........... 370/331; 370/328; 370/329; 455/436; 455/439; 455/442

(58) Field of Classification Search
USPC ........... 370/252, 329, 331; 455/436, 439, 442
See application file for complete search history.

(56) References Cited

U.S. PATENT DOCUMENTS

| 6,845,238 B1 | 1/2005 | Muller | |
|---|---|---|---|
| 8,310,946 B2 | 11/2012 | Somasundaram et al. | |
| 2005/0260990 A1 | 11/2005 | Huang et al. | |
| 2008/0318576 A1 | 12/2008 | So et al. | |
| 2009/0238117 A1* | 9/2009 | Somasundaram et al. | 370/328 |
| 2009/0239533 A1* | 9/2009 | Somasundaram et al. | 455/434 |
| 2010/0279679 A1* | 11/2010 | Young et al. | 455/423 |
| 2011/0216732 A1* | 9/2011 | Maeda et al. | 370/329 |

FOREIGN PATENT DOCUMENTS

| JP | 2003-509982 A | 3/2003 |
|---|---|---|
| JP | 2010-531124 A | 9/2010 |
| JP | 2011-516000 A | 5/2011 |
| WO | WO 01/20942 A1 | 3/2001 |
| WO | WO 2009/043002 A2 | 4/2009 |

OTHER PUBLICATIONS

3rd Generation Partnership Project (3GPP), R2-094652, "Radio Link Failure in CSG Deployments", Motorola, 3GPP TSG-RAN WG2 #67, Shenzhen, China, Aug. 24-28, 2009, 2 pages.

(Continued)

*Primary Examiner* — Jianye Wu
*Assistant Examiner* — Jeff Banthrongsack
(74) *Attorney, Agent, or Firm* — Condo Roccia Koptiw LLP

(57) ABSTRACT

Systems, methods, and instrumentalities are disclosed that may provide for a WTRU to perform measurements in order to avoid radio link failure that may occur because the WTRU's neighboring cells are, or include, CSG cells. For example, thresholds may be implemented to compensate for the presence of CSG cells, a WTRU may make adjustments when performing measurements, etc.

30 Claims, 8 Drawing Sheets

(56) References Cited

OTHER PUBLICATIONS

3rd Generation Partnership Project (3GPP), R2-097445, 36.331 CR, "Introduction of Proximity Indication", Samsung, 3GPP TSG-RAN2 Meeting #68, Jeju, Korea, Nov. 9-13, 2009, 11 pages.

3rd Generation Partnership Project (3GPP), R2-097466, 36.331 CR, "Induction of Network Ordered System Information Reporting", NTT Docomo, Inc., 3GPP TSG-RAN WG2 Meeting #68, Jeju, Korea, Nov. 9-13, 2009, 15 pages.

3rd Generation Partnership Project (3GPP), R2-097474, 25.331 CR, "On Support of Inbound Mobility to CSG Cell and Hybrid Cell", Huawei 3GPP TSG-RAN WG2 Meeting #68, Jeju, Korea, Nov. 9-13, 2009, 81 pages.

3rd Generation Partnership Project (3GPP), RP-091223, "Home NB and Home eNB Mobility Enhancements", Huawei, 3GPP TSG-RAN #46, Sanya, China, Dec. 1-4, 2009, 7 pages.

3rd Generation Partnership Project (3GPP), TS 25.467, V1.0.0., "3rd Generation Partnership Project; Technical Specification Group Radio Access Network; UTRAN Architecture for 3G Home NodeB", Stage 2, (Release 8), Dec. 2008, 23 pages.

3rd Generation Partnership Project (3GPP), TS 25.367, V9.1.0., 3rd Generation Partnership Project; Technical Specification Group Radio Access Network; Mobility Procedures for Home NodeB, Overall Description, Stage 2, (Release 9), Sep. 2009, 13 pages.

\* cited by examiner

EVALUATING AND REPORTING MEASUREMENTS FOR H(E)NB OUTBOUND MOBILITY AND INTER-H(E)NB MOBILITY IN CONNECTED MODE

CROSS REFERENCE TO RELATED APPLICATIONS

This application claims the benefit of U.S. Provisional Patent Application No. 61/293,511 filed Jan. 8, 2010, the contents of which are hereby incorporated by reference herein.

BACKGROUND

Home Node-Bs (HNBs) and Home e-Node-Bs (HeNBs), hereinafter collectively referred to as Home Node-Bs (HNB) may be used to increase cellular coverage and overall system throughput. These HNBs may have a dense deployment and be located in the coverage area of one or more macro (e)Node-Bs.

The term HNB may refer to a physical device that is similar to a wireless local area network (WLAN) access point (AP). The HNB may provide users with access to Universal Mobile Telecommunications System (UMTS), 3rd Generation Partnership Project (3GPP) Long Term Evolution (LTE), and other telecommunication services over small service areas, such as homes, retail businesses, or small offices. The HNB may connect to the operators' core network by using, for example, an internet connection (e.g., digital subscriber line (DSL)).

A HNB closed subscriber group (CSG) cell may be a determined area over which radio coverage provided by the HNB may be accessed by a group of subscribers authorized to use the services of the cell. These authorized WTRUs may be referred to as members of the CSG cell. The CSG may be a family or any user in the vicinity of a particular location, (e.g., anyone in a coffee shop), that attempts to access the HNB CSG cell. The subscriber, (e.g., an individual or an organization), may deploy a CSG cell using a HNB over an area where such service is desired. Each WTRU may store a white list (e.g., an allowed CSG list) which may include the CSG Identities (IDs) of the CSG cells it is authorized to access. When referred to hereafter, the term hybrid cell may include but is not limited to a cell that works like a CSG cell for member WTRUs and like an open cell for non-member WTRUs.

IDLE mode mobility (and states used for mobility e.g., IDLE, CELL_PCH and URA_PCH for UMTS, IDLE) describe procedures for when the WTRU may be using limited uplink resources. Connected mode mobility (e.g., CELL_ DCH for UMTS) may include procedures for the WTRU when uplink resources are being more heavily utilized. Connected mode mobility for CSG cells may include a proximity indication wherein the WTRU may send a proximity indication message to the network if the WTRU determines that a possible allowed CSG cell is nearby. The WTRU may make this determination based on fingerprint match, which may include information the WTRU stores when it visits a CSG cell that is part of its white list. It may include information on the neighboring macro cells (e.g. PSC/Physical Cell Identity (PCI) of six macro cells) or localization information (e.g., GPS coordinates). The fingerprint information may include the PSC/PCI of the CSG cell.

Procedures for mobility between H(e)NBs and outbound mobility may be different than for inbound mobility. For example, in UMTS inter-frequency measurements may be triggered when the serving frequency quality falls below a predetermined threshold. If the network decides that inter frequency measurements need to be performed, the network may send control signaling. An event may also be signaled along with the measurements. For inter-frequency measurement a reporting event $2x$ may be used. For example, in UMTS, events that may trigger a Measurement Report may include: Event $2a$: Change of Best Frequency; Event $2b$: The estimated quality of the currently used frequency is below a certain threshold and the estimated quality of a non-used frequency is above a certain threshold; Event $2c$: The estimated quality of a non-used frequency is above a certain threshold; Event $2d$: The estimated quality of the currently used frequency is below a certain threshold; Event $2e$: The estimated quality of a non-used frequency is below a certain threshold; or, Event $2f$: The estimated quality of the currently used frequency is above a certain threshold.

Events $3x$ (e.g., $3a$-$3d$) may be used for measurement control and reporting for inter-RAT handover.

SUMMARY

Systems, methods, and instrumentalities are disclosed that may provide for a WTRU to perform measurements in order to avoid radio link failure that may occur because the WTRU's neighboring cells are, or include, CSG cells.

The neighboring cells of a WTRU may be, or may include, CSG cells. A WTRU may receive an indication to measure a CSG cell. For example, the WTRU may receive a signal, information, etc., from the network to measure one or more CSG cells. The CSG cell may have a PSC in a network signaled PSC CSG range. The WTRU may measure a quality associated with the CSG cell on a second frequency. For example, the WTRU may measure received signal power from the CSG cell. The CSG cell on the second frequency may be identified by referencing a CSG virtual active set that has a single CSG cell per frequency. The single CSG cell may be a best cell in the PSC CSG range.

The indication to measure the CSG cell received by the WTRU may be in response to, for example, a determination or detection made by the WTRU or network. The WTRU may determine that it is in proximity to a CSG cell and send a message to the network indicating such proximity. The WTRU may determine that a quality associated with a first frequency falls below a first threshold and trigger an event indicating that a measurement needs to be taken. The network, with or without information from the WTRU, may determine that a measurement is necessary and send an indication to the WTRU to take the measurement.

The neighboring cells of a WTRU may be, or may include, CSG cells. The WTRU may determine that a first quality associated with a first frequency falls below a first threshold. For example, a WTRU may determine that the signal quality of its serving cell falls below a level that may indicate a handover is necessary to avoid radio link failure. The WTRU may trigger an event indicating to the network that a measurement needs to be taken. For example, measurements may need to be taken so a handover may be performed before radio link failure occurs. The WTRU may measure a second quality associated with a CSG cell on a second frequency. The WTRU may identify the CSG cell on the second frequency by referencing a CSG virtual active set. The CSG virtual active set may identify a single CSG cell per frequency. A similar concept may be applicable to the same or used frequency wherein the WTRU may measure and maintain a CSG Virtual Active Set for handover purposes.

The neighboring cells of a WTRU may include non-allowed CSG cells. The WTRU may perform measurements taking into account the presence of the non-allowed CSG cells. The WTRU may exclude non-allowed CSG cells from the measurement. The WTRU may add an offset to a neighboring non-allowed CSG cell when measuring the first quality.

The WTRU may determine that its neighboring cells are CSG cells. The WTRU may compensate for such a configuration of neighboring cells.

The WTRU may lower the first threshold. By using a lower threshold, the WTRU may trigger an event sooner. For example, a WTRU may trigger an event at an earlier stage.

The WTRU may read system information of the neighboring CSG cells when the first quality (e.g., signal quality of its serving cell) associated with the first frequency falls below a second threshold. The second threshold may be set so that system information of the neighboring CSG cells is read within a time that may allow the WTRU to start handover before radio link failure.

The WTRU may determine that it is under the coverage of a campus scenario and/or measures a CSG cell that belongs to a campus H(e)NBs network. The WTRU may send a notification to the network that handovers are to take place between CSG cells.

In a campus scenario a WTRU may ignore a macro cell, e.g., in order to be handed-over to a CSG cell. A WTRU may determine that a first quality associated with a first CSG cell on a first frequency falls below a first threshold. When the first quality falls below the first threshold, a second quality associated with a macro cell may be above a second threshold. For example, the macro cell may have a signal quality that may indicate making a handover to the macro cell. The WTRU may ignore the macro cell by triggering an event indicating that a measurement needs to be taken. The measurement may be taken of a third quality associated with a second CSG cell on a second frequency (e.g., non-used frequency), wherein the second CSG cell on the second frequency is identified by referencing a CSG virtual active set that has a single CSG cell per frequency (e.g., the best CSG cell). The WTRU may send an indication that the macro cell has been ignored.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

FIGS. 1-6 may relate to exemplary embodiments in which the disclosed systems, methods and instrumentalities may be implemented. However, while the present invention may be described in connection with exemplary embodiments, it is not limited thereto and it is to be understood that other embodiments may be used or modifications and additions may be made to the described embodiments for performing the same function of the present invention without deviating therefrom.

When referred to hereafter, the terminology "wireless transmit/receive unit (WTRU)" may include, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" may include, but is not limited to, a Node-B, a site controller, an access point (AP), or any other type of interfacing device capable of operating in a wireless environment.

When referred to hereafter, the terminology "signal quality" or "cell quality" may include, but are not limited to, the quality of a signal from a cell, e.g., per one or more measurements taken by a WTRU. For example, for LTE, this may correspond to Reference Signal Received Quality (RSRQ) or Reference Signal Received Power (RSRP). For UMTS this may correspond to common pilot channel (CPICH) Energy per Chip/power density in the band (Ec/No), CPICH received signal code power (RSCP) or path loss.

When referred to hereafter, the terminology "frequency quality" may include, but is not limited to, a combined quality of different cells on the same frequency.

When referred to hereafter, the terminology CSG ID may include, but is not limited to, a CSG Identity; CGI may include, but is not limited to, a Cell Global Identity; and, SI may include, but is not limited to, the SI (System Information) broadcasted by a cell.

When referred to hereafter, the terminology "non-allowed CSG cells" may include, but is not limited to, CSG cells whose CSG IDs are not part of the WTRU white list; and, "a WTRU member of a CSG cell" may include, but is not limited to, a WTRU with a white list of CSG IDs that matches the CSG ID of the CSG cell.

When referred to hereafter, the terminology "campus scenario" is not limited to a real campus. Further, "campus scenario" may include, but is not limited to, an area covered by multiple CSG cells, which may or may not be under the coverage of a macro cell. Other examples of campus scenarios may include for example an enterprise where employees have access to different CSG cells or an airport where travelers may access CSG cells throughout the airport area, e.g., after required payment to the service provider.

Figure 1A:
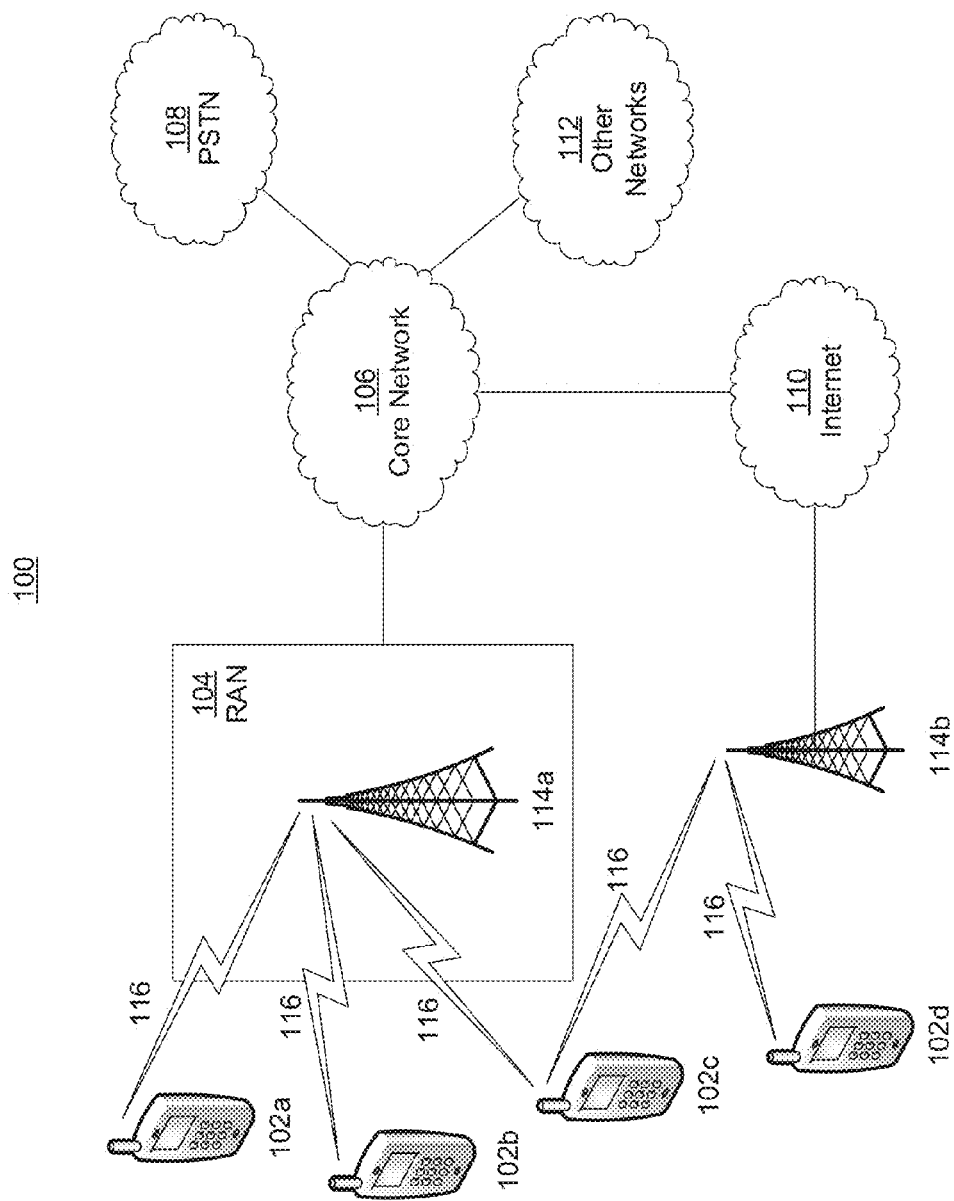
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114*b*, which may employ an IEEE 802 radio technology.

Figure 1B:
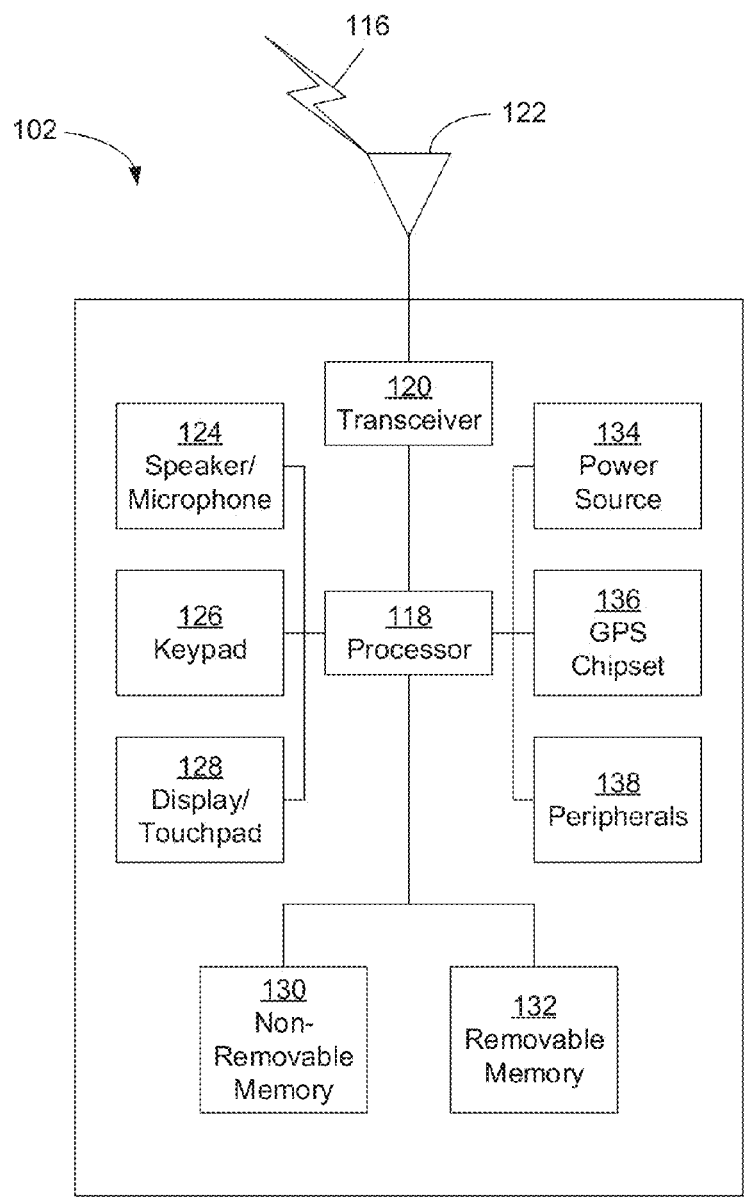
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
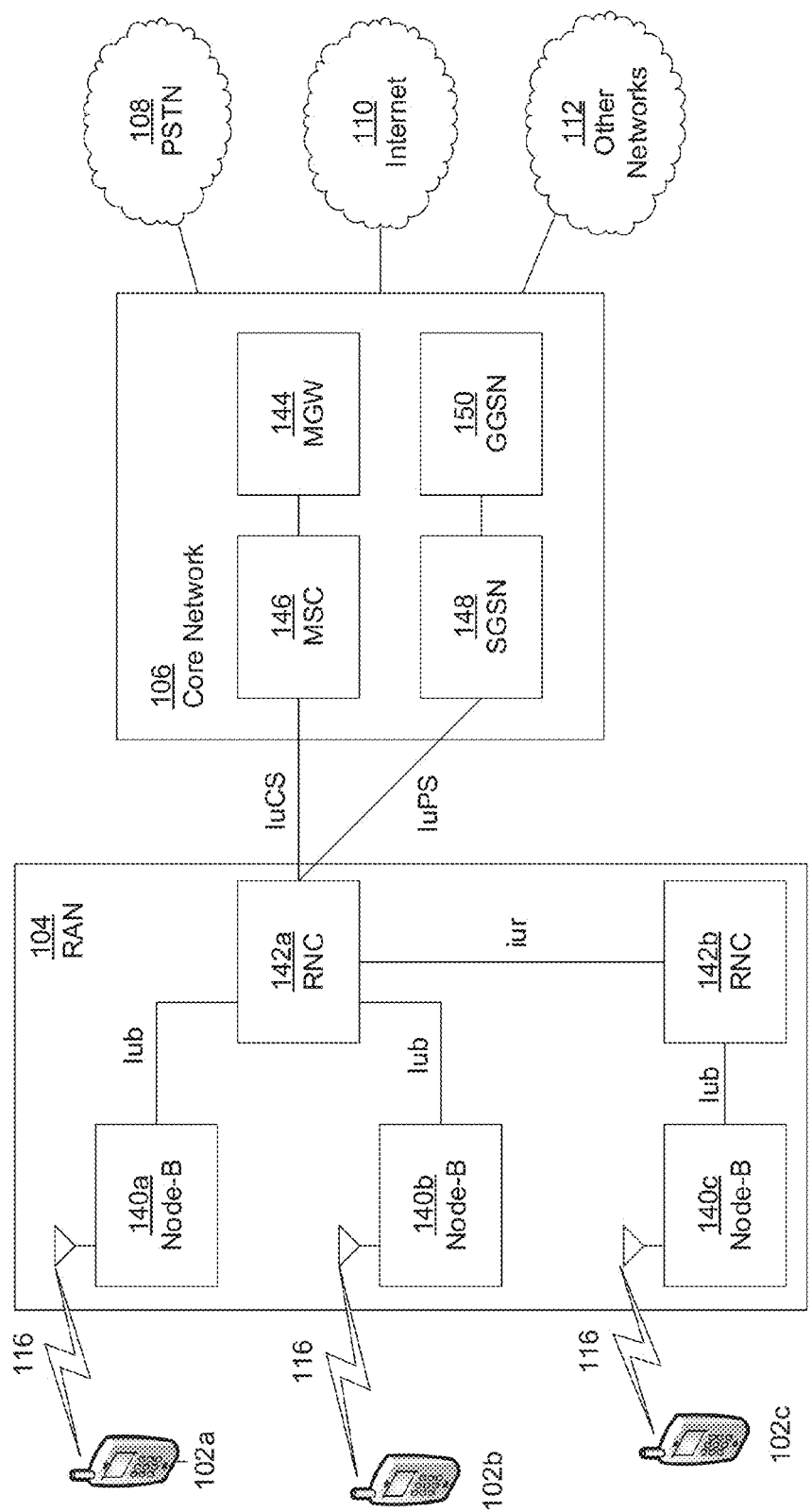
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102*a*, 102*b*, 102*c* over the air interface 116. The RAN 104 may also be in communication with the core network 106. As shown in FIG. 1C, the RAN 104 may include Node-Bs 140*a*, 140*b*, 140*c*, which may each include one or more transceivers for communicating with the WTRUs 102*a*, 102*b*, 102*c* over the air interface 116. The Node-Bs 140*a*, 140*b*, 140*c* may each be associated with a particular cell (not shown) within the RAN 104. The RAN 104 may also include RNCs 142*a*, 142*b*. It will be appreciated that the RAN 104 may include any number of Node-Bs and RNCs while remaining consistent with an embodiment.

As shown in FIG. 1C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 2:
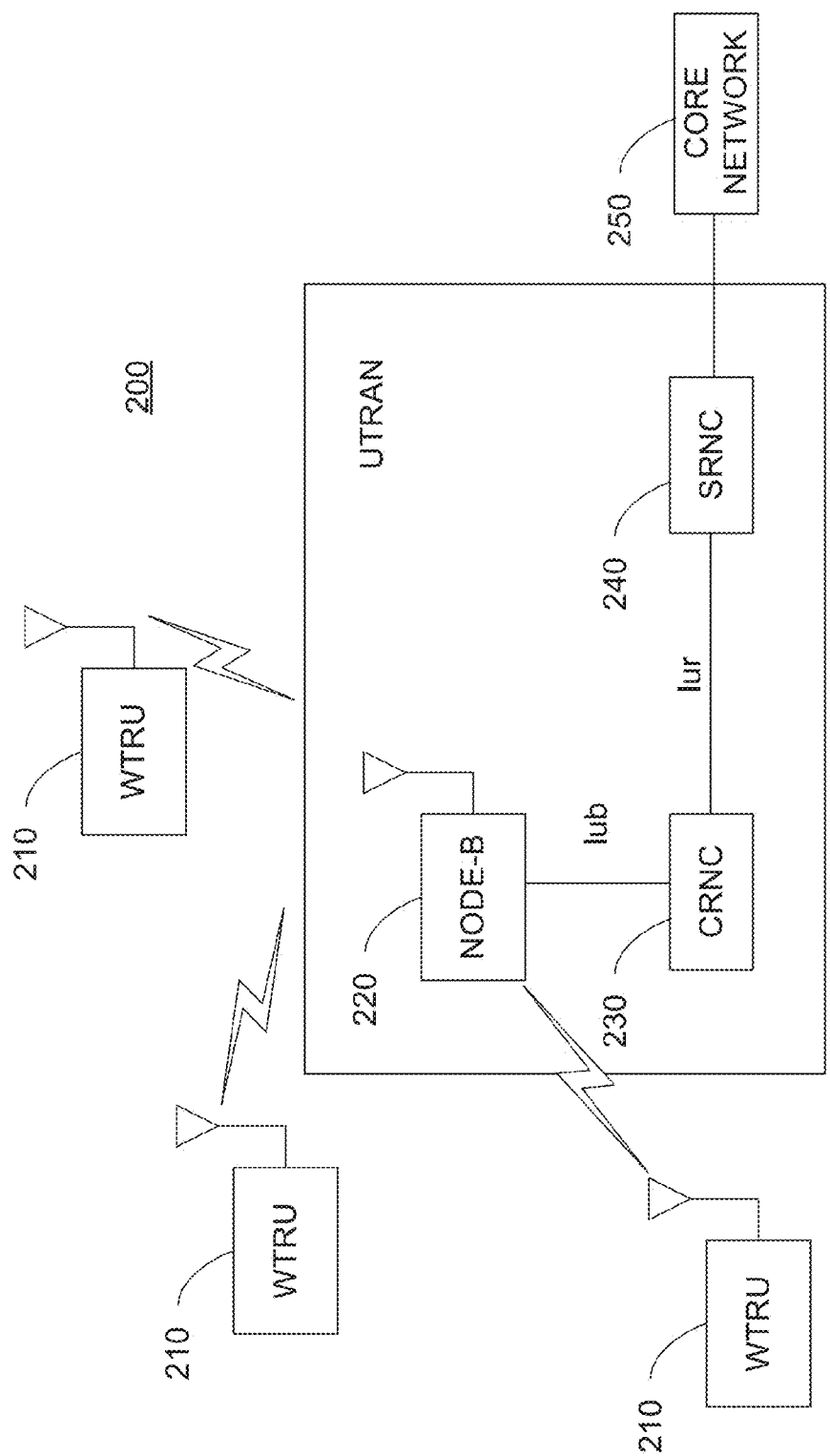
FIG. 2 shows a wireless communication system including a plurality of WTRUs, a Node-B, a controlling radio network controller (CRNC), a serving radio network controller (SRNC), and a core network.

FIG. 2 shows an exemplary wireless communication system 200 including a plurality of WTRUs 210, a Node-B 220, a controlling radio network controller (CRNC) 230, a serving radio network controller (SRNC) 240, and a core network 250. The Node-B 220 and the CRNC 230 may collectively be referred to as the UTRAN.

As shown in FIG. 2, the WTRUs 210 may be in communication with the Node-B 220, which is in communication with the CRNC 230 and the SRNC 240. Although three WTRUs 210, one Node-B 220, one CRNC 230, and one SRNC 240 are shown in FIG. 2, it should be noted that any combination of wireless and wired devices may be included in the wireless communication system 200.

Figure 3:
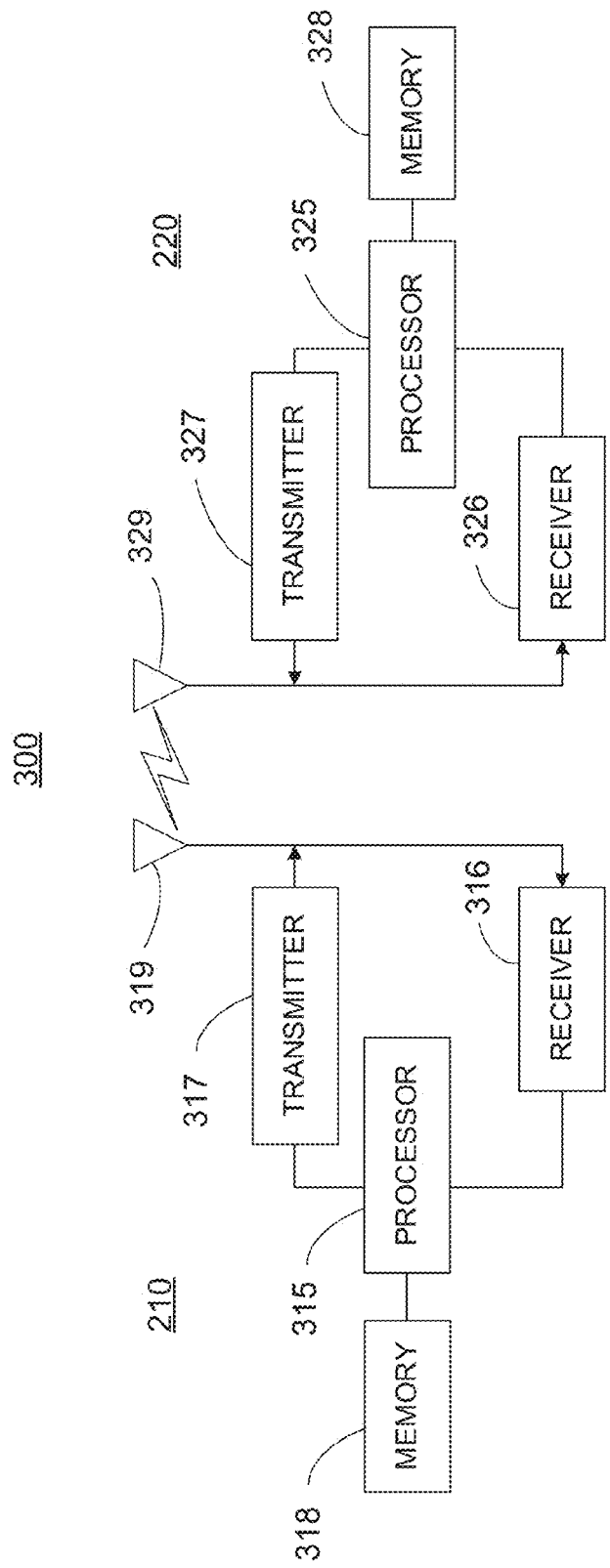
FIG. 3 is a functional block diagram of a WTRU and the Node-B of the wireless communication system of FIG. 2.
Figure 4:
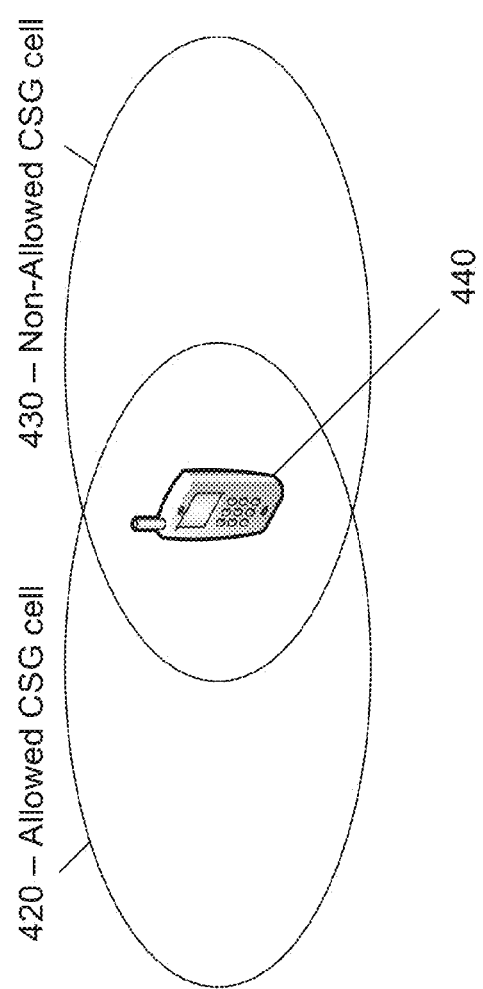
FIG. 4 illustrates an exemplary neighboring CSG cell scenario.

FIG. 3 is a functional block diagram 300 of the WTRU 210 and Node-B 220 of the wireless communication system 200 of FIG. 2. As shown in FIG. 3, the WTRU 210 may be in communication with the Node-B 220 and both may be configured to perform a method of evaluating and reporting measurements for H(e)NB outbound mobility and inter-H(e)NB mobility in connected mode.

In addition to the components that may be found in a typical WTRU, the WTRU 210 may include a processor 315, a receiver 316, a transmitter 317, a memory 318 and an antenna 319. The memory 318 may be provided to store software including operating system, application, etc. The processor 315 may be provided to perform, alone or in association with the software, a method of evaluating and reporting measurements for H(e)NB outbound mobility and inter-H(e)NB mobility in connected mode. The receiver 316 and the transmitter 317 may be in communication with the processor 315. The antenna 319 may be in communication with both the receiver 316 and the transmitter 317 to facilitate the transmission and reception of wireless data.

In addition to the components that may be found in a typical Node-B, the Node-B 220 may include a processor 325, a receiver 326, a transmitter 327, a memory 328 and an antenna 329. The processor 325 may be configured to perform a method of method of evaluating and reporting measurements for H(e)NB outbound mobility and inter-H(e)NB mobility in connected mode. The receiver 326 and the transmitter 327 may be in communication with the processor 325. The antenna 129 may be in communication with both the receiver 326 and the transmitter 327 to facilitate the transmission and reception of wireless data.

A WTRU may be configured to signal an event to the network indicating that it needs to measure other frequencies or other radio access technologies (RAT) to handover to another cell before a radio link failure occurs. An existing event, such as 2d for UMTS, may not be triggered if the frequency quality, which takes into account the neighboring cells on the same frequency including non-allowed CSG cells, remains above a predetermined threshold. This may be seen with reference to FIG. 4, which illustrates that a WTRU 440 may have neighboring cells that include an allowed CSG cell 420 and a non-allowed CSG cell 430.

As an example, at least some neighboring cells on a serving frequency are CSG cells. The WTRU may be configured to determine whether it is a member of the neighbor CSG cells. The WTRU may determine that it is not a member of neighboring CSG cells. For example, the WTRU may determine that the WTRU does not have a fingerprint match for cells other than for its serving cell, (e.g., its serving cell is a CSG cell and its neighboring cells are non allowed CSG cells), or by using another method (e.g., receiving a list of its allowed CSG cells). If the WTRU is not a member of the neighbor CSG cells and the quality of the serving cell falls below a predetermined threshold, there may be a risk that a radio link failure may occur.

Systems, methods, and instrumentalities are disclosed that may provide for a WTRU to perform measurements in order to avoid radio link failure that may occur because the WTRU's neighboring cells are, or include, CSG cells. Exemplary implementations may include one or more of the following.

Figure 5:
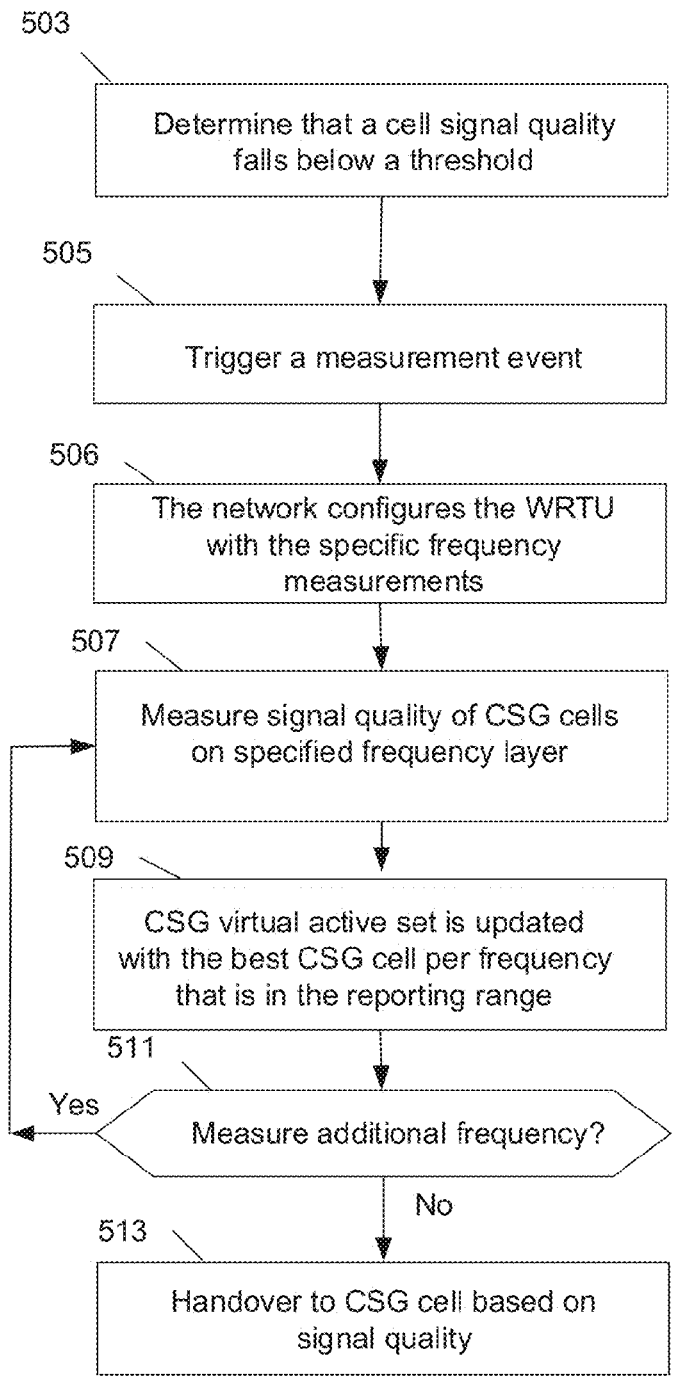
FIGS. 5 and 6 illustrate exemplary measurement methods for handover.

The neighboring cells of a WTRU may be, or may include, CSG cells. FIG. 5 illustrates an exemplary measurement method for handover. At 503, the WTRU may determine that a signal quality associated with a first frequency falls below a threshold. For example, a WTRU may determine that the signal quality of its serving cell falls below a level that may indicate a handover is necessary to avoid radio link failure. At 505, the WTRU may trigger a measurement event indicating to the network that a measurement needs to be taken. For example, measurements may need to be taken so a handover may be performed before radio link failure occurs. At 506, the network may configure the WTRU with a new set of measurements including CSG cells on a specific or multiple frequency layer(s) that have their PSCs in the specified PSC split. At 507, the WTRU may perform measurements on a specified frequency layer for CSG cells. At 509, the CSG Virtual Active Set may be updated, e.g., with the best CSG cell(s) if the cell(s) is(are) in the configured reporting range. If the CSG Virtual Active Set size is set to 1, then the CSG Virtual Active Set may have 1 cell, which may be the best CSG cell. A best CSG cell may be identified as the CSG cell with the best measurement on a frequency, e.g., using one or more of: path loss, received signal power, ECNO, RSCP, etc. At 511, a determination may be made whether to measure an additional frequency (non-used frequency). If so, the method may continue at 507. If not, the method may continue at 513. At 513, a handover may be performed to a CSG cell based on the signal quality measurements.

Figure 6:
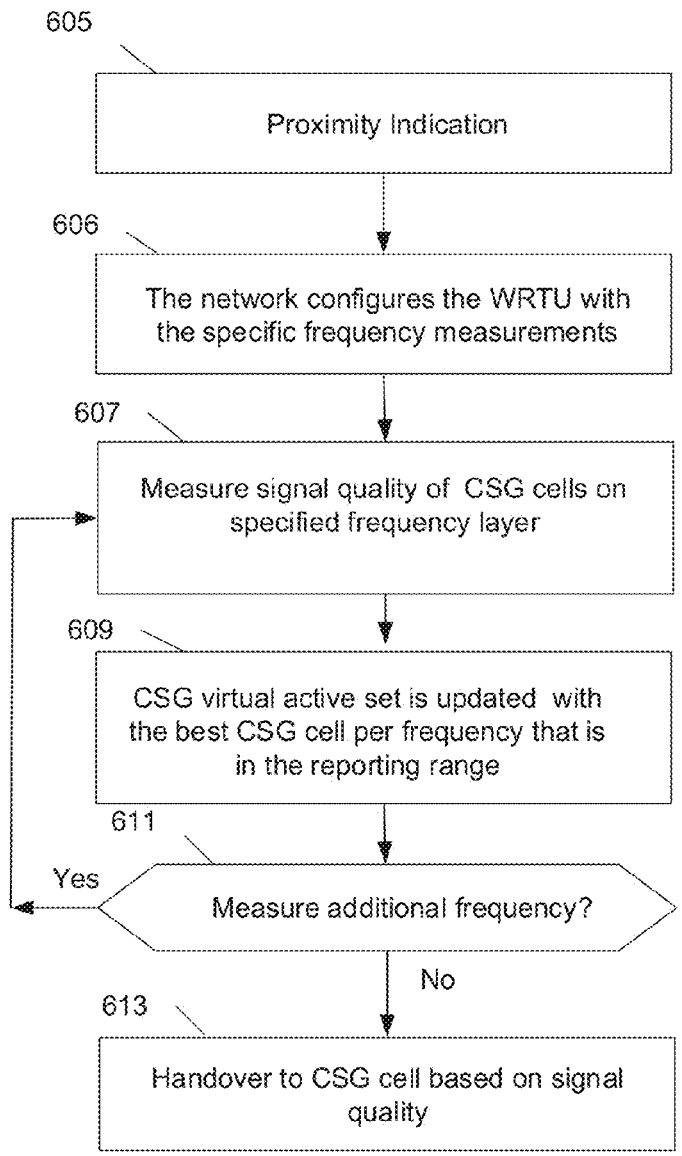

FIG. 6 illustrates an exemplary measurement method for handover. At 605, a proximity indication may be received from the WTRU notifying the network that it is close to a CSG cell from its whitelist, for example based on a fingerprint match. At 606, the network may configure the WTRU with new measurements. At 607, the WTRU may measure the signal quality of the CSG cells on the specified frequency layer. At 609, the CSG Virtual Active Set may be updated with the best CSG cell(s) that is(are) in the reporting range. If the CSG Virtual Active Set size is set to 1, the CSG Virtual Active Set may have one cell, which may be the best CSG cell. At 611, a decision may be made whether to measure an additional frequency based on the measurement configuration received from the network. The method may continue at 613 and a WTRU assisted handover procedure may be started. The method presented in FIG. 6 may start directly at 606, e.g., if the network decides to start measurements on its own criteria without any WTRU notification.

The WTRU may be configured to generate a frequency quality estimate without accounting for non-allowed CSG cells. The WTRU may, for example, exclude the non-allowed CSG cells in the frequency virtual active set measurements evaluation. The WTRU may apply the exclusion of the non-allowed CSG cells from the frequency virtual active set to other inter-frequency events 2x as well. The WTRU may also apply the exclusion to inter-RAT events 3x, such as 3a, in addition to or separately from the exclusion to events 2x. The WTRU may consider non-allowed CSG cells part of the frequency virtual active set, but the definition of the frequency quality estimate for event 2d, or for any inter-frequency event 2x, or for inter-RAT events 3x may be updated to indicate that the measurement results of the non-allowed CSG cells may not be taken into account in the sum of the cells measurement results. The frequency quality estimate may be computed using Equation 1 as described in further detail hereafter. If the network signals the CSG cells to be measured on a particular frequency (non-used frequency), then Equation 2 may be applicable with the parameters explained as network signaled H(e)NB cells and parameters as specified herein. If the computed quality of the CSG cell using the specified equation is fulfilling the conditions (e.g., quality threshold) for the required amount of time, an event may be sent.

Event 2d criteria may be performed as follows. The WTRU may be configured to add an offset for each neighboring non-allowed CSG cell to an existing absolute threshold used in the entering and leaving equations used for determining whether event 2d criteria are met. The offset may reduce the impact of the non-allowed CSG cells during the determination of whether an event 2d may be triggered. The offset may be unique for each non-allowed CSG cell, may be unique per CSG (taking into account that multiple cells may have the same CSG), or differ between non-allowed CSG cells. The offset may be a fixed value implemented in the WTRU or an offset signaled by the network in an RRC message, (e.g., measurement control). The offset may be part of the SI broadcast by the cells. This may be applied to other inter-frequency events 2x and to inter-RAT events 3x, such as 3a.

A UMTS intra-frequency event, (e.g., event 1K), or an inter-frequency event, (e.g., event 2g), may be added and triggered when the serving cell quality is below a predetermined threshold. The intra-frequency event may be used, for example, in the CSG cell case since H(e)NB cells may not be part of the WTRU active set. When the network receives this event 1K or event 2g, the network may determine that the WTRU needs to perform inter-frequency or inter-RAT measurements and may configure the WTRU accordingly. The network may determine that the WTRU needs to perform inter-frequency or inter-RAT measurements based in part on not receiving an intra-frequency event from the WTRU indicating that an intra-frequency neighboring cell quality is better than the serving cell or that the intra-frequency neighboring cell quality is above a predetermined threshold.

The WTRU may send a type of event specific to CSG cells in a measurement report, or, the WTRU may send an RRC message to notify the network it needs to measure other frequencies or other RATs since accessing neighboring CSG cells on the serving frequency may not be allowed.

The WTRU may reuse a signal (e.g., the CSG Proximity Indication type in the measurement or ProximityIndication message), to notify the network to measure other frequencies or other RAT. The WTRU may use these signals even if there are acceptable CSG cells in its neighborhood, since it is not a member of these CSG cells. The WTRU may set the value of enum to "leaving", and/or an information element (IE) may be added in the "CSG Proximity Indication" type and in the ProximityIndication message. The information element may be a flag, an enum or of another type, which, for example, may be called NeighborCSGsNotAllowed or may take another name. The WTRU may be configured to set this IE to TRUE when it determines that access to the neighboring CSG cells is not allowed, there is no neighbor macro cell with an acceptable quality signal, and/or when the serving cell quality is below a predetermined threshold.

If the WTRU has not determined whether it is a member of its neighboring CSG cells, and the estimated quality of the current frequency, excluding CSG cell quality, is below a predetermined threshold, then the WTRU may request information from the network to identify whether its neighbor CSG cells are allowed. This request may be transmitted in an RRC message (e.g., measurement control). The network may receive this message and may order the WTRU to read the SI of its neighboring CSG cells to determine the CSG IDs and whether the WTRU is a member or not. The network may determine the CSG IDs of the WTRU neighboring cells and may indicate to the WTRU to which neighboring CSG cells it is a member.

If the WTRU is located such that it is covered by CSG cells, but not other cells (e.g., not covered by macro cells or hybrid cells), the WTRU may be configured to handover quickly from one CSG cell to another CSG cell. The WTRU may not have determined the CSG cells it is a member of in advance. While trying to acquire the SI of multiple CSG cells before finding an allowed CSG cell, the WTRU may experience radio link failure.

The WTRU may be configured to trigger a measurement event to the network at a predetermined time or event. For example, the WTRU may trigger an event when it determines that all neighbor cells are CSG cells (e.g., by using the PSC/PCI range broadcasted by the cells and checking if the detected PSC/PCI are part of this range). The WTRU may be configured to reuse existing events instead of directly using the threshold signaled by the network for evaluating if the triggering criteria are met with regard to the serving cell. For example, the WTRU may reuse UMTS intra-frequency events 1x (e.g., 1f), or inter-frequency events 2x (e.g., 2d or 2b), inter-RAT events 3x (e.g., event 3a), or, for LTE events, Ax and Bx (e.g., events A2, A5 or B2). When determining whether a serving cell quality is below a predetermined threshold, the WTRU may add an offset to this threshold to start a CSG handover evaluation procedure while the serving cell quality remains acceptable for a predetermined period of time. A new type of measurement event for CSG cells or a new RRC message may be used, that may be sent by the WTRU when the serving cell quality falls below a predetermined threshold and when the neighboring cells are closed CSG cells. The network may select this threshold such that the WTRU predetermines an amount of time to read the SI of several CSG cells before finding a CSG cell that the WTRU is allowed to access. That is, the threshold may be increased to start the procedure earlier.

After receiving the event from the WTRU, the network may configure the WTRU for reading the SI of its neighboring CSG cells and report to the network. The network may initiate the handover procedure to an allowed CSG cell. If no other CSG cell is allowed for the WTRU in the neighborhood, the user may be notified of the situation before the WTRU goes out of service so that it may decide to move to another area. This may be achieved by having the WTRU RRC send a message to the WTRU Non Access Stratum (NAS) indicating that none of the neighbor CSG cells are allowed for this WTRU. The WTRU RRC may transmit this indication after reading the SI of the neighboring CSG cells and determining that none of the neighbor CSG cells were allowed to the WTRU. The WTRU may also transmit this indication after the WTRU sends a measurement event to the network, or after the network sends a message requiring the WTRU to notify the user that no CSG cells are allowed in the neighborhood besides the current serving CSG cell, and that the serving cell quality is below a predetermined threshold. The user notification may include, but is not limited to, displaying a warning on the WTRU, or any other method (e.g., an alarm sound if the user is currently using voice services).

Two different types of thresholds may be used. The first threshold, which may be referred to as threshold_2, may be used to trigger a measurement event when the serving cell quality falls below a predetermined threshold (e.g., it may be too weak to indicate to the network that a handover is needed). The second threshold, which may be referred to as threshold_1, may be higher than threshold_2. The second threshold may be used to trigger a measurement event to indicate to the network that the SI of the neighboring CSG cells may need to be acquired (e.g., serving cell quality may be decreasing). Threshold_2 may be configured by the network in an RRC message (e.g. a measurement control or an RRCConnection-Reconfiguration message).

The WTRU may be configured to autonomously read the SI of the neighbor CSG cells to determine whether it is a member of any of these cells. This may be triggered when the WTRUs serving cell quality is below a predetermined threshold and the neighbor cells are closed CSG cells (e.g., their PSC/PCI is within the CSG PSC/PCI range(s)). The stored SI may be valid for a predetermined period of time, and/or be deleted once a handover on a different CSG cell occurs. The stored SI may be deleted when the WTRU leaves the area of the CSG cells. The stored SI may include CSG specific information (e.g., Cell Identity, CGI, CSG ID, membership to the CSG, etc.), and may comprise other types of information. When reading the SI, the WTRU may store the information that is to be transmitted to the network for the handover evaluation. When the network requests the WTRU to provide the SI CSG information, the WTRU may not be required to re-read the SI and may send the stored SI to the network. The WTRU may be configured to store the CSG ID or the membership status, (e.g., member or not member), along with the PSC/PCI so that it may determine in advance which CSG cells it may be allowed to access. The WTRU may also be configured to read the SI of the allowed CSG cells again when requested by the network in order to get up-to-date SI. This may reduce the memory usage of the WTRU but may increase the battery usage as compared to storing all the SI CSG fields the first time the WTRU reads the SI of the CSG cell. A WTRU variable may be added to store the SI of the CSG neighboring cells. For example, in UMTS, this variable may be called NEIGHBOR_CSG_CELLS_SI and for LTE it may be called NeighborCsgCellsSi. Existing WTRU variables may be used and additional fields added. For example, in UMTS these fields may be added in CELL_INFO_LIST, CELL_INFO_CSG_LIST, or in another WTRU variable. In LTE these fields may be added in the existing variables VarMeasConfig, VarMeasReportList, or in another WTRU variable. The new WTRU variable, or the fields added in existing WTRU variables, may include one or a combination of the following: CSG ID; WTRU membership status to this CSG (member or not member); Cell Identity for UMTS or CGI for LTE or equivalent information; PSC/PCI; or CSG cell signal quality.

If the WTRU determines the identity of neighboring CSG cells it is allowed to access, the WTRU may be configured to read the SI of these allowed CSG cells without reading the SI of the non-allowed CSG cells. The network may authorize, enable, or disable a WTRU using this feature in a control message. The control message may be an RRC message (e.g., measurement control or RRCConnectionReconfiguration message). An IE may be added, (e.g., in the CSG proximity detection field or in the ReportProximityConfig-r9 field), for enabling or disabling this WTRU functionality.

In a campus scenario, where a particular area may be entirely covered by multiple CSG cells and under the coverage of a macro cell, the WTRU may potentially access a CSG cell anywhere in the campus while at the same time it may access the macro cell. In some campus scenarios, the WTRU may access all the CSG cells, while in other scenarios the WTRU may be limited to accessing a subset of the CSG cells. In the latter case, the network may signal a list indicating the CSG cells the WTRU is allowed to access. The signal may include frequency and PSC/PCI of the CSG cells and/or the Cell Identity or CGI in an RRC message (e.g., a measurement control message or RRCConnectionReconfiguration). When moving in the campus area between CSG cells, the WTRU may perform handover from one CSG cell to another CSG cell, but may also perform handover from one CSG cell to the macro cell and from the macro cell to another CSG cell. Handovers to the macro cell may result in loss of some enhanced services. The WTRU may be configured to not trigger the usual measurement event (e.g. event 1D or event A3) when the macro cell signal quality is better than the serving cell quality unless the WTRU may not become a member of other neighboring CSG cells. If the CSG serving cell quality is below a predetermined threshold and a handover is needed to avoid radio link failure, the WTRU may be configured to ignore the macro cell and send a measurement event to the network indicating that its serving cell is below a predetermined threshold while a neighboring CSG cell is above a predetermined threshold. This may occur even if the macro cell quality is better than the neighbor CSG cell quality. An IE may be included in a measurement event, (e.g., event 1D or event A5), to indicate to the network that the WTRU is ignoring a macro cell. The network may be configured to use this information for interference management purposes. A measurement event (e.g., "Serving cell quality becomes worse than threshold_1 and neighbor CSG cell quality becomes better than threshold_2") or RRC message may be added supplying similar information. When the network receives this event or message, the network may determine that that WTRU may be handed over to a CSG cell if the CSG cell is better than the serving cell, even though a macro cell may be better than the CSG cell. The WTRU may compute separate quality measurements for the macro cells and CSG cells on a particular frequency layer. The network may configure the UE measurements that include CSG cells and macro cells on a specific frequency layer. In this case, the WTRU may use Equations 3 and 4 or the generalized versions 8 or 9 in order to compute the macro respectively CSG related frequency qualities and then use the related configured measurement events (2x for inter-frequency or 3x for inter RAT) in order to perform an inter CSG cell handover or an outbound handover to a macro cell. The WTRU may be configured with different events separately for CSG and macro cells. The UE may use Equation 5 or 6 in order to determine a delta quality between the macro and CSG cells on the same frequency layer. The delta quality may be reported to the network. Each quality (macro and CSG) may be reported independently or together using modified event report RRC messages or a new RRC message. Based on the above measurement reports the network may decide to handover the UE to a cell from the macro layer or to a neighboring CSG cell.

The WTRU may be configured to notify the network that during a predetermined period of time, during the current connection, or until a new notification is sent, the WTRU may perform handover to CSG cells when available and allowed, and not to macro cells. The WTRU may transmit the notification in an RRC message (e.g., RRC connection request, RRC connection setup complete), in a measurement report, or in a proximity indication (e.g., when the proximity indication is set to "entering"), and, an IE may be included that may be called "HOtoCsgOnly." The WTRU may send another notification to disable this feature, for example, when it does not want to ignore macro cells.

Since the H(e)NB cells may not be included in the WTRU active set, the WTRU may reuse existing intra-frequency measurement events for UMTS for updating the active set to trigger a handover from or to a H(e)NB cell between cells on the same frequency. This concept may be used for the CSG virtual set maintenance/update on inter frequency. For example, event 1D "Change of best cell" may be reused and the definition broadened to cells not part of the active set in case of H(e)NB cells, so that if a neighbor cell is better than the current serving cell, the WTRU may send an event 1D to the network even if the neighbor cell is not in the active set. This may be because the serving cell is a H(e)NB cell and the WTRU does not have any active set, or because the neighbor cell is a H(e)NB cell and may not be part of the WTRU active set. An IE may be added to the definition of event 1D so that the network may explicitly indicate to the WTRU whether this event 1D may be triggered for H(e)NB cells also, or, may be restricted to H(e)NB cells for the case when at least one of the cells involved is a H(e)NB cell (e.g., one of the cells between the serving cell and the neighbor cell is a H(e)NB cell). An intra-frequency measurement event specific to H(e)NB cells, for example event 1K, may be added with the following definition "The quality of a neighbor cell becomes better than the quality of the serving cell." The WTRU may send this event when one of the cells involved, for example the serving cell or the neighbor cell, is a H(e)NB cell.

The WTRU may be configured to send an intra-frequency event when the serving cell quality is below a predetermined threshold, a neighbor cell quality is above a predetermined threshold, and one of the cells (e.g., serving cell or neighbor cell), is a H(e)NB cell. This concept may be extended to the CSG virtual active set maintenance/update on inter-frequency when the network configures the UE to measure CSG cells on a particular frequency layer. An event, which may be called event 1L, may be added with the following definition "The quality of the serving cell is below a predetermined threshold and the quality of a neighbor cell is above a predetermined threshold."

The WTRU may use an RRC message other than the measurement report message to signal new measurement events. The WTRU may use the proximity indication (type of measurement and message) to indicate to the network that an intra-frequency neighboring cell is better than the serving cell, for example, if at least one of the cells is a H(e)NB cell.

When the WTRU sends an intra-frequency measurement event or RRC message, it may include one or a combination of the following as IEs: PSC/PCI of the neighbor cell; Signal quality of the neighbor cell; Signal quality of the serving cell; Type of the neighbor cell: CSG, non-CSG; Type of the serving cell: CSG, non-CSG; or an indication if serving cell and neighbor cell have the same type (e.g. if both are CSG cells).

The frequency quality formulas used by the WTRU may be modified due to the specificity of the inter H(e)NB mobility. Because of the specific PSC/PCI range used for the CSG cells, virtual active set implementations may be used to accommodate the inter HNB mobility in connected mode.

The term virtual active set may include, but is not limited to, the collection of PSCs from the CSG range and macro cells layer outside of the PSC range following rules for the virtual active set reporting and updating. The network may signal a different threshold for the CSG virtual active set reporting and the macro cell virtual active set.

When referred to hereafter, the terminology CSG virtual (active) set may be a subset of the virtual active set, comprising the set of PSCs in the network signaled PSC CSG range, for that frequency following rules for the virtual active set reporting and updating. The network may signal different thresholds for the CSG virtual active set reporting and the macro cell virtual active set.

The term allowed CSG virtual (active) set may be a subset of the virtual active set comprising the set of PSCs in the PSC CSG range, for whom the CSG ID is allowed, for that frequency following rules for the virtual active set reporting and updating. The network may signal a different threshold for the allowed CSG virtual active set reporting and the macro cell virtual active set.

The HNB may not allow for soft handover cells (macro diversity combining). If this is the case, then the CSG virtual active set may be constituted of a single cell.

When referred to hereafter, the terminology "macro cell" may include, but is not limited to, an open cell or a hybrid cell of any coverage size.

Disclosed herein are exemplary equations that may be used with the disclosed systems, methods, and instrumentalities.

The WTRU may be configured to exclude non-allowed CSG cells when estimating the frequency quality. For example, the frequency quality may be calculated as follows:

$$Q_{frequency j} = W_j \cdot 10 \cdot \text{Log}\left(\sum_{i=1}^{N_{Aj}} M_{ij}\right) + (1 - W_j) \cdot 10 \cdot \text{Log} M_{Best j} \qquad \text{Equation 1}$$

Where the variable $Q_{frequency j}$ is the estimated quality of the virtual active set on frequency j excluding the non-allowed CSG cells. The variable $M_{ij}$ is a measurement result of cell i in the virtual active set on frequency j excluding the non-allowed CSG cells. The variable $N_{Aj}$ is the number of cells in the virtual active set on frequency j not including the non-allowed CSG cells. The variable $M_{Best j}$ is the measurement result of the cell in the virtual active set on frequency j with the highest measurement result and which is not a non-allowed CSG cell. The variable $W_j$ is a parameter sent from UTRAN to WTRU and used for frequency j.

The WTRU may be configured to use the allowed CSG cells to compute the frequency quality. For example, the frequency quality may be calculated as follows:

$$Q_{frequencyC\ SGj} = \qquad \text{Equation 2}$$

$$W_j \cdot 10 \cdot \text{Log}\left(\sum_{i=1}^{N_{ACSGi}} M_{ij}\right) + (1 - W_j) \cdot 10 \cdot \text{Log} M_{CSGBestj}$$

Where the variable $Q_{frequencyCSGj}$ is the estimated quality of the allowed CSG cells on frequency j. The variable $W_j$ is a parameter signaled by the network for the frequency "j" related measurements. The variable $M_{ij}$ is the measurement of the allowed CSG cell "i" on the frequency "j" from the allowed CSG virtual active set. The variable $N_{ACSGi}$ is the number of allowed CSG cells measured by the WTRU on frequency "j" that are members of the allowed CSG virtual active set. The variable $M_{CSGBestj}$ is the best CSG cell measured by WTRU on frequency "j" from the allowed CSG virtual active set.

The WTRU may use signaled CSG cells to compute the frequency quality. In this case, the parameters in Equation 2 may be interpreted as follows: $W_j$ is a parameter signaled by the network for the frequency "j" related measurements. The variable $M_{ij}$ is the measurement of the signaled CSG cell "i" on the frequency "j". $N_{ACSGi}$ is the number of CSG cells measured by the WTRU on frequency "j" from the CSG virtual set. The variable $M_{CSGBestj}$ is the best CSG cell measured by WTRU on frequency from the CSG virtual set.

If the WTRU has not determined which CSG cells it is allowed to access in the neighbor cells list, which may comprise macro cells and CSG cells, the WTRU may use one of the following formulas to compute the frequency "j" qualities for macro cells (Equation 3) and CSG cells (Equation 4) respectively:

$$Q_{Macrofrequencyj} = W_{jM} \cdot 10 \cdot \text{Log}\left(\sum_{i=1}^{N_{ACSGi}} M_{ij} + \sum_{k=1}^{P_{Bk}} M_{kj}\right) + \qquad \text{Equation 3}$$

$$(1 - W_{jM}) \cdot 10 \cdot \text{Log} M_{Bestj}$$

Where the variable $Q_{Macrofrequencyj}$ is the estimated quality of the macro cells on frequency j. The variable $W_{jM}$ is a parameter signaled by the network for frequency "j" macro cells related measurements. The variable $M_{ij}$ is the measurement of the CSG cell "i" on the frequency "j" member of the virtual active set. The variable $M_{kj}$ is the measurement of the macro cell "k" on the frequency "j" member of the virtual active set. The variable $N_{ACSGi}$ is the number of CSG cells measured by the WTRU on frequency "j" from the CSG virtual set. The variable $P_{Bk}$ is the number of macro cells measured by the WTRU on frequency "j" from the virtual active set. The variable $M_{Bestj}$ is the best macro cell measured by WTRU on frequency "j" from the virtual active set.

$$Q_{CSGfrequencyj} = W_{jCSG} \cdot 10 \cdot \text{Log}\left(\sum_{i=1}^{N_{ACSGi}} M_{ij} + \sum_{k=1}^{P_{Bk}} M_{kj}\right) + \qquad \text{Equation 4}$$

$$(1 - W_{jCSG}) \cdot 10 \cdot \text{Log} M_{CSGBestj}$$

Where the variable $Q_{CSGfrequencyj}$ is the estimated quality of the CSG cells on frequency j. The variable $W_{jCSG}$ is a parameter signaled by the network for the frequency "j" CSG cells related measurements. The variable $M_{ij}$ is the measurement of the CSG cell "i" on the frequency "j" member of the virtual active set. The variable $M_{kj}$ is the measurement of the macro cell "k" on the frequency "j" member of the virtual active set. The variable $N_{ACSGi}$ may be the number of CSG cells measured by the WTRU on frequency "j" from the CSG virtual set. The variable $P_{Bk}$ is the number of macro cells measured by the WTRU on frequency "j" from the virtual active set. The variable $M_{CSGBestj}$ is the best CSG cell measured by WTRU on frequency "j" from the CSG virtual active set.

The WTRU may use the above formulas to compute frequency qualities. The WTRU may use the computed qualit (ies) to determine whether to send an event or a combined event (macro cell and CSG cell) to the network, report the computed quantities using a RRC message, etc.

The WTRU may compute a delta frequency quality value by comparing the macro cell frequency quality and the CSG cell frequency quality and send a single event based on the result:

$$\Delta Q_{frequencyj} = Q_{Macrofrequencyj} - Q_{CSGfrequencyj} \qquad \text{Equation 5}$$

Using the above macro cell and CSG cell qualities, the network may signal one or two weights to be applied to the delta frequency quality. A generalized formula may be described as follows:

$$\Delta Q_{frequencyj} = \alpha \cdot Q_{Macrofrequencyj} - \beta \cdot Q_{CSGfrequencyj} \qquad \text{Equation 6}$$

Where $\alpha$ is the weight to be applied for the Macro cell's quality. The variable $\beta$ is the weight to be applied for the CSG cell's quality.

The network may signal different offsets, for example, one for the CSG cells and a different one for the macro cells, to be applied to the frequency quality.

A generalized formula may be described as follows:

$$Q_{frequencyj} = W_j \cdot 10 \cdot \text{Log}\left(\chi \cdot \sum_{i=1}^{N_{ACSGi}} M_{ij} + \gamma \cdot \sum_{k=1}^{P_{Bk}} M_{kj}\right) + \qquad \text{Equation 7}$$

$$(1 - W_j) \cdot 10 \cdot \text{Log}(\lambda \cdot M_{Bestj})$$

Where $$\lambda = \begin{cases} \chi, & M_{Bestj} = M_{CSGBestj} \\ \gamma, & M_{Bestj} = M_{MacroBestj} \end{cases} \qquad \text{Equation 8}$$

The above formula may be further generalized by applying individual weights to the macro and CSG cells respectively, as follows:

$$Q_{frequencyj} = W_j \cdot 10 \cdot \text{Log}\left(\sum_{i=1}^{N_{ACSGi}} \chi_i \cdot M_{ij} + \sum_{k=1}^{P_{Bk}} \gamma_k \cdot M_{kj}\right) + \qquad \text{Equation 9}$$

$$(1 - W_j) \cdot 10 \cdot \text{Log}(\lambda \cdot M_{Bestj})$$

Where:

$$\lambda = \begin{cases} \chi_i, & M_{Bestj} = M_{ij} \\ \gamma_k, & M_{Bestj} = M_{kj} \end{cases} \qquad \text{Equation 10}$$

And $M_{ij}$ may be the best cell from the CSG virtual active set and $M_{kj}$ may be the best macro cell, $\chi_i$ and $\gamma_k$ being their corresponding weights.

The WTRU may send an event to the network based on results from an above formula and a threshold(s), e.g., set by the network.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method to determine signal quality relating to a handover from a first frequency, the method comprising:
   receiving an indication to take a CSG measurement associated with a non-used frequency;
   measuring a quality associated with a CSG cell on the non-used frequency; and
   updating, by a wireless transmit/receive unit (WTRU), a CSG virtual active set to have a single CSG cell associated with the non-used frequency, wherein the single CSG cell is a best CSG cell associated with the non-used frequency.

2. The method of claim 1, wherein the CSG cell has a PSC in a network signaled PSC CSG range.

3. The method of claim 1, wherein the single CSG cell is a best cell in a PSC CSG range.

4. The method of claim 1, further comprising determining a proximity to the CSG cell.

5. The method of claim 4, wherein the CSG cell is part of a whitelist.

6. The method of claim 4, further comprising sending a message indicating the proximity.

7. The method of claim 1, further comprising:
   determining that a first frequency quality falls below a first threshold; and
   triggering an event indicating that a measurement needs to be taken.

8. The method of claim 1, wherein the indication is received from a network, and wherein the indication is in response to the network determining that a measurement is necessary without reference to information from a measuring device.

9. A method to determine signal quality relating to a handover, the method comprising:
   determining that a first quality associated with a first frequency falls below a first threshold;
   triggering an event indicating that a measurement needs to be taken; and
   updating a CSG virtual active set to have a single CSG cell associated with a non-used frequency, wherein the single CSG cell is a best CSG cell associated with the non-used frequency.

10. The method of claim 9, further comprising measuring the first quality, wherein non-allowed CSG cells are excluded when measuring the first quality.

11. The method of claim 9, further comprising measuring the first quality, wherein an offset is added to a neighboring non-allowed CSG cell when measuring the first quality.

12. The method of claim 9, further comprising:
    determining that neighboring cells are CSG cells; and
    increasing the first threshold.

13. The method of claim 9, further comprising reading system information of neighboring CSG cells when the first quality associated with the first frequency falls below a second threshold.

14. The method of claim 9, further comprising reading system information of neighboring CSG cells when the first quality associated with the first frequency falls below a second threshold and neighboring cells are CSG cells.

15. The method of claim 9, further comprising sending a notification that handovers are to take place between CSG cells.

16. A wireless transmit/receive unit (WTRU) comprising:
    a processor configured to:
    receive an indication to take a CSG measurement associated with a non-used frequency;
    measure a quality associated with a CSG cell on the non-used frequency; and
    update a CSG virtual active set to have a single CSG cell associated with the non-used frequency, wherein the single CSG cell is a best CSG cell associated with the non-used frequency.

17. The WTRU of claim 16, wherein the CSG cell has a PSC in a network signaled PSC CSG range.

18. The WTRU of claim 16, wherein the single CSG cell is a best cell in a PSC CSG range.

19. The WTRU of claim 16, wherein the processor is further configured to determine a proximity to the CSG cell.

20. The WTRU of claim 19, wherein the CSG cell is part of a whitelist.

21. The WTRU of claim 19, wherein the processor is further configured to send a message indicating the proximity.

22. The WTRU of claim 16, wherein the processor is further configured to:
    determine that a first frequency quality falls below a first threshold; and
    trigger an event indicating that a measurement needs to be taken.

23. The WTRU of claim 16, wherein the indication is received from a network, and wherein the indication is in response to the network determining that a measurement is necessary without reference to information from a measuring device.

24. A wireless transmit/receive unit (WTRU) comprising:
    a processor configured to:
    determine that a first quality associated with a first frequency falls below a first threshold;
    trigger an event indicating that a measurement needs to be taken; and
    update a CSG virtual active set to have a single CSG cell associated with a non-used frequency, wherein the single CSG cell is a best CSG cell associated with the non-used frequency.

25. The WTRU of claim 24, wherein the processor is further configured to measure the first quality, wherein non-allowed CSG cells are excluded when measuring the first quality.

26. The WTRU of claim 24, wherein the processor is further configured to measure the first quality, wherein an offset is added to a neighboring non-allowed CSG cell when measuring the first quality.

27. The WTRU of claim 24, wherein the processor is further configured to:
   determine that neighboring cells are CSG cells; and
   increase the first threshold.

28. The WTRU of claim 24, wherein the processor is further configured to read system information of neighboring CSG cells when the first quality associated with the first frequency falls below a second threshold.

29. The WTRU of claim 24, wherein the processor is further configured to read system information of neighboring CSG cells when the first quality associated with the first frequency falls below a second threshold and neighboring cells are CSG cells.

30. The WTRU of claim 24, wherein the processor is further configured to send a notification that handovers are to take place between CSG cells.

* * * * *